United States Patent [19]

Bachle

[11] Patent Number: 4,481,697
[45] Date of Patent: Nov. 13, 1984

[54] COMBINED STRAIN RELIEF AND CORD GRIP

[75] Inventor: Walter W. Bachle, Harwinton, Conn.

[73] Assignee: General Signal Corporation, Stamford, Conn.

[21] Appl. No.: 556,070

[22] Filed: Nov. 30, 1983

Related U.S. Application Data

[63] Continuation of Ser. No. 382,879, May 28, 1982, abandoned.

[51] Int. Cl.³ .................. H02G 3/22; F16L 21/02
[52] U.S. Cl. .................. 24/135 R; 24/136 R; 339/103 B; 174/65 G; 174/65 SS; 174/153 G
[58] Field of Search .......... 24/135 R, 136 R, 136 L; 339/103 R, 103 B, 103 M; 174/65 G, 65 R, 65 SS, 153 G; 248/56

[56] References Cited

U.S. PATENT DOCUMENTS

| 3,184,706 | 5/1965 | Atkins | 339/103 R |
| 3,624,591 | 11/1971 | Buberniak | 339/103 R |
| 3,732,526 | 5/1973 | Punako | 339/103 R |
| 3,744,008 | 7/1973 | Castellani | 339/103 B |
| 4,209,661 | 6/1980 | Pate et al. | 339/103 R |
| 4,293,178 | 10/1981 | Lee | 339/103 R |
| 4,304,422 | 12/1981 | Schwarz | 285/4 |
| 4,350,840 | 9/1982 | Michaels | 174/65 SS |

Primary Examiner—Gene Mancene
Assistant Examiner—David I. Tarnoff
Attorney, Agent, or Firm—Martin LuKacher; Milton E. Kleinman

[57] ABSTRACT

An improved cord grip and strain relief fitting to restrain and seal flexible cord to an enclosure or junction box. The structure includes a body member, a grommet, a strain relief member and a nut. Tightening the nut onto the body member results in radial forces between the grommet and the cord to restrain the cord and provide a water tight seal. The grommet is stuffed into the body member by an interaction between the grommet and the strain relief member as the nut is engaged with the body member. The lower end of the strain relief member has legs which mate with sockets in the grommet and which receive a radial inward force during final assembly causing the legs to pivot inward and apply an additional retaining and restraining force on the cord. The strain relief member has an upper portion which flares away from the cord thereby providing an increased radius of curvature if the cord is deflected from its longitudinal direction at the external end of the fitting.

13 Claims, 10 Drawing Figures

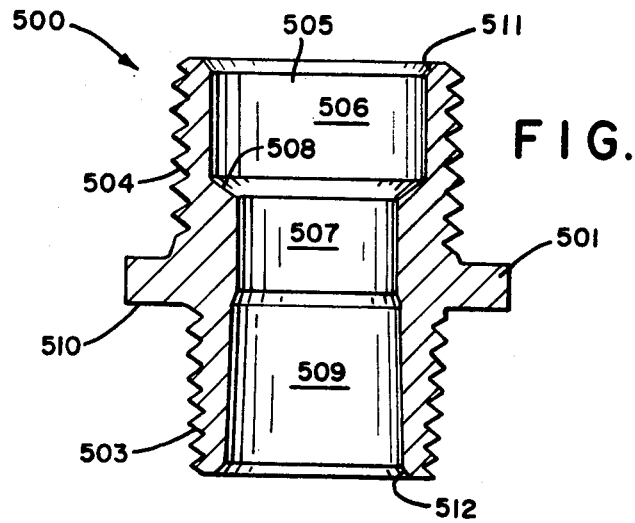
FIG. 5
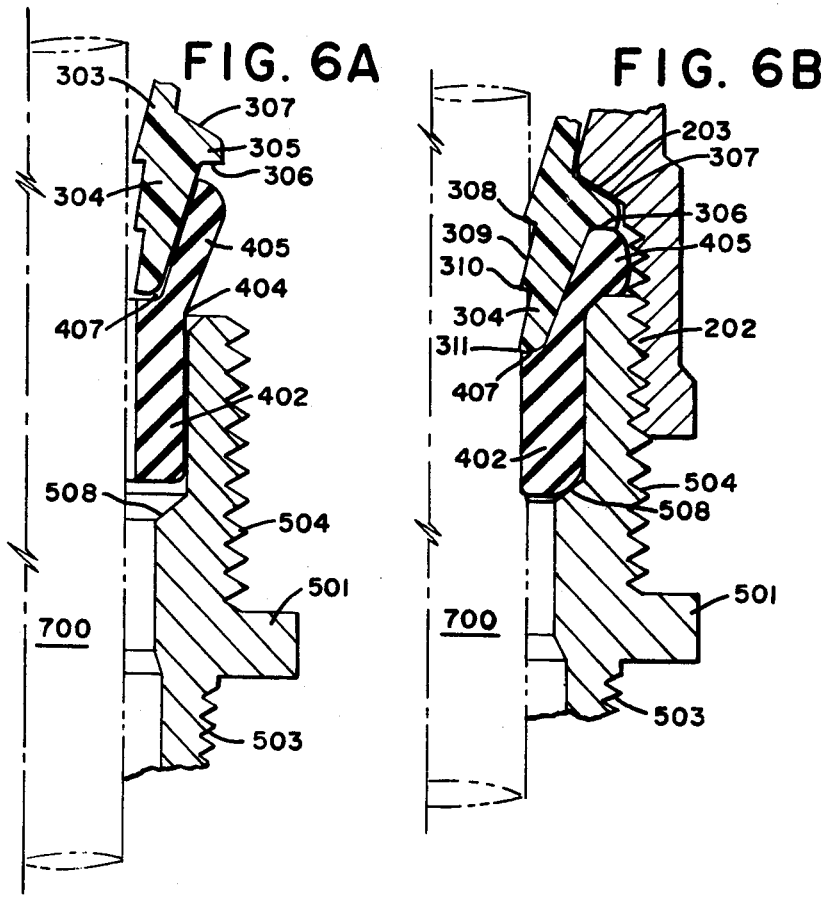
FIG. 6A
FIG. 6B

COMBINED STRAIN RELIEF AND CORD GRIP

This is a continuation of application Ser. No. 382,879 filed May 28, 1982, which is now abandoned.

BACKGROUND OF THE INVENTION

Electrical devices have become so common that without including lamps, it is not unusual for a home to have forty or fifty electrical devices. Many of these are portable and plug into convenience outlets although some are permanently wired. Typical plug-in devices include: clocks, hand tools, mixers, irons, toasters, electric razors, hair curlers, hair dryers, dehumidifiers and a wide variety of other devices. Most of the devices named use relatively little power with a maximum of the order of 1,000 watts. There are other devices which may use substantially more power such as: large room air conditioners, electric ranges, electric heaters, large ventilator fans and heavy duty power tools.

Every householder is very familiar with two types of problems relating to these portable devices. One problem is that through use, and sometimes misuse, the cord is pulled from its retaining means in the housing resulting in possible short circuits, loss of power and sometimes a fire hazard. Another problem which may result from use and possibly misuse is that the electric cord is bent at a sharp angle where it emerges from the device housing which may result in a break in the outer insulation and eventually the exposure of bare wires or possibly the fracturing of the internal wires through repeated bending.

In industrial application, wherein the present structure is expected to find its main utility, all the same problems exist and in addition, the structure is subject to mechanical abuses such as vibration and excessive tension and flexing forces as well as hostile environments such as exposure to water, oil and/or other industrial liquids and compounds.

The strain relief structure of this invention may be used to connect an electrical supply cord to outlet or junction boxes or panels on industrial equipment such as machine tools, outdoor illuminating devices, meter sockets, cranes and hoists, and a wide variety of portable machinery.

Many devices have been designed to try to prevent one or the other or both of these general difficulties and examination of almost any of the named devices will disclose a commercially used technique. The wide variety of devices in current use attests to the fact that no single device is suitable for all applications and/or that the ideal device remains to be designed.

U.S. Pat. No. 3,322,890 issued May 30, 1967 to J. C. Kennedy et al discloses a bushing seal fabrication from a deformable or ductile material such as nylon. Since the device is not fully threaded, it will exert radial forces and bind the wire positioned therein when the bushing device is threaded into a housing so that an unthreaded portion of the device is in the threaded area of the housing.

U.S. Pat. No. 3,352,961 issued Nov. 14, 1967 to H. Simon discloses another form of cable clamp which is formed of a plastic material having a plurality of jaws connected by relatively thin portions which are adapted to be compressed and urged into frictional engagement with the insulation of the wire and thereby hold the same in position against tension exerted on the wire. In some applications using structures having similar characteristics, the high unit pressures may tend to rupture the insulating jacket.

U.S. Pat. No. 3,796,504 issued Mar. 12, 1974 to G. A. G. Marechal teaches a clamping mechanism including jaws which are cammed into clamping relationship with the wire during assembly of the structure.

U.S. Pat. No. 4,095,043 issued June 13, 1978 to H. B. Martin et al discloses a technique wherein the wire is forced into a "U" shape in tightly confined quarters, thereby inhibiting movement of the wire in response to longitudinal forces.

U.S. Pat. No. 4,095,765 issued June 20, 1978 to M. Aimar discloses a cable clamp which may be used with a variety of cable diameters and which provides a pawl member which is brought into contact with the wire in response to the insertion and tightening of a screw.

U.S. Pat. No. 4,116,472 issued Sept. 26, 1978 to L. P. Schmitt discloses a body member having projecting legs which, as the assembly is tightened, are caused to pivot towards the centrally located wire and grasp same. To make the structure fluid tight, a membrane member is used.

SUMMARY OF THE INVENTION

Although the structure of the present invention is suitable for general utility, it is believed that it will be used primarily with devices of the class which use substantial electrical power and/or those devices which are subjected to exceptionally heavy use. The structure is designed to provide a secure grip on the electrical cord so that the cord may not be pulled from the cord grip which, in turn, is coupled to an associated housing or junction box or other suitable structure. In addition, the structure of the invention is designed to minimize the production of a sharp bend in the wire if it is pulled in a direction at right angles to that form from which it emerges from the fitting. A water tight seal is provided between the wire and the fitting and between the fitting and the structure to which it is coupled.

These broad objectives are achieved by providing a fitting which includes a body member having a through passage and which is externally threaded and a gland nut member which mates therewith. A grommet member and a strain relief member are designed to surround the electrical cord and to be, for the most part, contained within the combination of the body member and the gland nut member. The various surfaces are configured and interrelated such that as the gland nut is secured to the body member by an increasing thread engagement, an internal shoulder of the nut bears on a flange or ring surface of the strain relief member which, in turn, has an underside thereof and finger projections which cooperate to stuff the grommet more firmly into the body housing. In response to such stuffing and the cooperation between the internal surface of the body member and the mating grommet member, a radial inward force is provided causing the grommet to clamp the electrical cord. In addition, as the grommet is stuffed into the housing, the housing applies radially inward pressure to a portion of the grommet which, in turn, applies radially inward pressure to the lower legs of the strain relief member which, in turn, pivot towards and are pushed against the electrical cord. The pressure of the grommet on the cord provides a water tight seal. The pressure of the lower legs of the strain relief member against the cord substantially enhances the ability of the structure to prevent longitudinal motion of the cord with respect to the fitting.

The upper portion of the strain relief member projects through the nut and flares away from the electrical cord. The strain relief member, at its upper external edges, is rounded and is not totally rigid. Accordingly, if the electrical cord is pulled at an angle normal to the cord axis as it emerges from the fitting, it will be seen that the strain relief member helps to increase the radius of curvature of the electric cord and provides a yielding surface which helps avoid the aforedescribed detrimental effects when a wire is pulled in such manner. Preferably, the grommet is formed with grooves to mate with the legs of the strain relief member. Another vital function of the structure is that it secures the electric supply cord against longitudinal movement. This prevents a longitudinal tension from being transmitted to the electrical connection as required by the National Electric Code. The strain relief member provides a transition between the flexible cable and the rigid fitting which helps eliminate or reduce the failure which usually occurrs at the point of first stiffness or rigidity where the cord enters the fitting.

From the foregoing and the following detailed description, it will be perceived that it is an object of the invention to provide a new and improved strain relief and cord grip structure.

It is another object of the invention to provide a strain relief and cord grip structure which is easy to assemble and which can securely grip the wire and provide a water tight seal without damaging the wire.

It is another object of the invention to provide a structure of the nature described wherein the forces which retain and restrain the electric cord are generated in response to securing a gland nut member to a body member.

It is another object of the invention to provide a structure wherein there is mutual cooperation among the various elements to help achieve the desired results.

It is a more specific object of the invention to provide a structure wherein as the gland nut member is secured to the body member, forces are applied whereby the strain relief member assists in stuffing the grommet member into the housing member.

It is a further object of the invention to provide a structure wherein as the grommet is stuffed into the housing member, the grommet applies forces to portions of the strain relief member for providing an additional grip to restrain the electrical cord against longitudinal motion with respect to the fitting.

It is another object of the invention to provide a structure including a strain relief member which serves to inhibit the formation of bends in the electrical cord with a small radius of curvature at the point of exit from the fitting.

BRIEF DESCRIPTION OF THE DRAWING

To permit incissive and detailed analysis of the structure and function of the various components comprising the inventive structure, various figures are shown. The drawing discloses one form of the invention and is not meant, in any way, to delimit its scope, it is rather so drawn as an aid in understanding the principles of the invention. In all figures, like parts are given like numbers and as a convenience, when the first digit is 2, 3, 4 or 5, additional details of that element may be seen more clearly in FIGS. 2, 3, 4 or 5, respectively.

FIG. 5 comprises a cross section of the body member;

FIG. 6A comprises an enlarged view of a portion of the assembly illustrated in FIG. 1; and FIG. 6B is similar to FIG. 6A but shows the elements in their fully assembled form.

DESCRIPTION OF THE PREFERRED EMBODIMENTS

Figure 1:
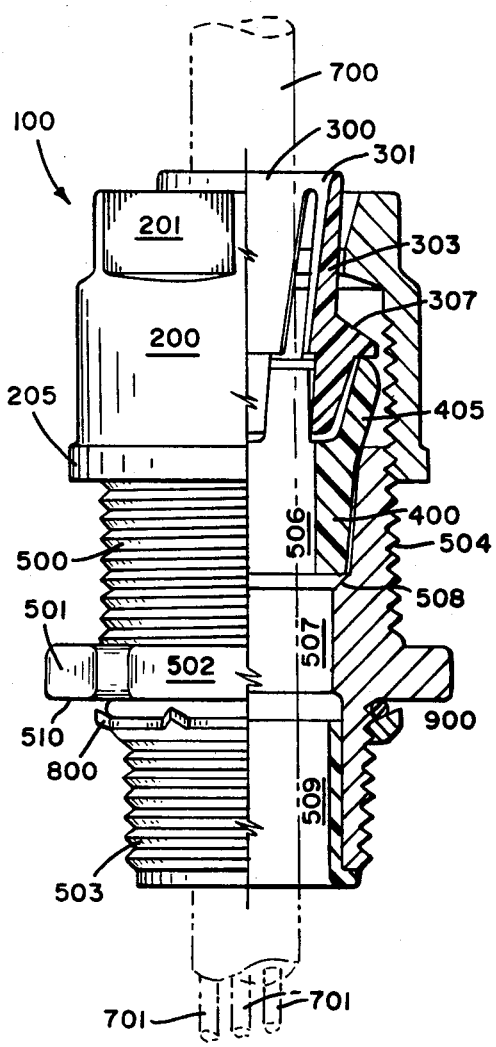
FIG. 1 comprises a partial cross section of the structure with the elements loosely assembled.
Figure 2:
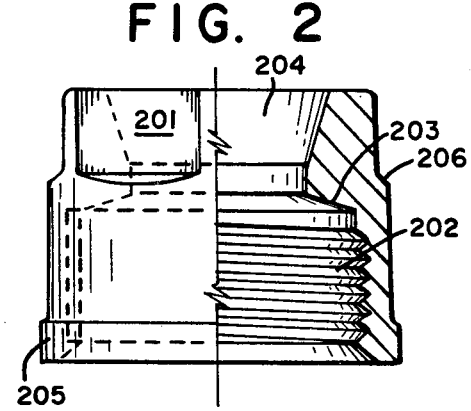
FIG. 2 comprises a partial cross section view of the nut.

Considering first more specifically FIG. 1, there will be seen therein the various major components which combine to provide the combined strain relief and cord grip assembly structure indicated generally as 100. The major components are the nut 200; the strain relief member 300; the grommet member 400; and the body member 500. The principle function of the combined strain relief and cord grip assembly 100 is to provide a liquid tight seal, secure a flexible wire 700 so that a longitudinal force will not remove the wire 700 from the assembly 100 and to avoid an excessively sharp bend of the wire 700 as it exits at the upper end of the assembly 100.

In addition to the named parts, there is also a lock nut 800 and a sealing ring 900. The lock nut 800 and sealing ring 900 serve a conventional function to secure the assembly 100 to a panel or junction box (not shown) in a standard manner which is wellknown to those familiar with electrical wiring devices.

The body member 500 may be more conveniently visualized and perceived by considering together FIGS. 1 and 5. The body 500 includes a flange 501 which, preferably, would include flat parallel surfaces such as 502 which will facilitate clamping and/or tightening the body member 500 with a wrench. Below the flange 501 will be seen tapered threads 503 which accommodate the lock nut 800 or which, alternatively, may be used to screw the body member 500 to mating threads in a junction box, or other device, in a well-known manner. The body member 500 also includes threads 504 above the flange 501 which, as will be seen, mate with internal threads of the nut 200.

The body member 500 includes a through passageway 505 which, while generally cylindrical, does not have a uniform diameter and could have any expedient shape including: oval, hourglass, hexagonal, etc. The upper chamber 506 has a larger diameter than a midchamber 507. The chambers 506 and 507 are joined by a taper 508 which serves a function to be described more fully hereinafter. The lower chamber 509 has a diameter which is generally no smaller than that of the mid-chamber 507.

As may be seen in FIG. 1, a wire 700 passes through the passageway 505 including the upper chamber 506, the mid-chamber 507 and the lower chamber 509. The undersurface 510 of the flange 501 may bear against a panel member (not shown) when the structure 100 is secured to a panel member by the lock nut 800 and the sealing ring 900 provides a liquid-tight seal between the flange 500 and the panel member.

Preferably, the body member 500 will comprise a member which could be metal or plastic and having the upper chamber 506 and mid-chamber 507 reamed or otherwise formed to the preferred diameter and depth.

The upper chamber 506 could be reamed to have slightly tapered sides. The body member 500 will preferably include an upper and lower machined chamfer 511 and 512, respectively. These chamfers help to eliminate any sharp edges which might damage a wire 700 pulled through the passageway 505.

Although the entire body member 505 could be machined from an appropriate steel, brass, aluminum or other alloy, it would more likely comprise an iron casting which may be cadmium plated or galvanized. Suitable plastic could also be used.

Figure 4A:
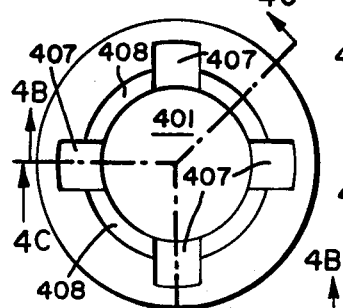
FIGS. 4A, 4B and 4C comprise views of the grommet member.
Figure 4B:
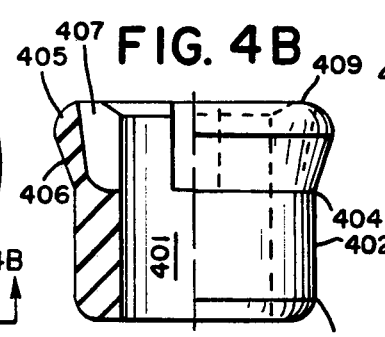
Figure 4C:
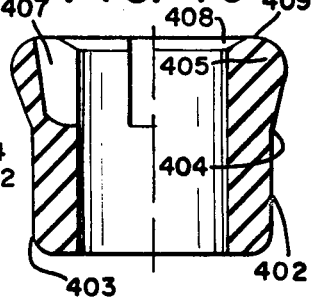

Another component of the assembly 100 is grommet 400, three views of which are shown as FIGS. 4A, 4B and 4C. While other suitable materials may be used, the grommet 400 is preferably fabricated of a material such as neoprene which is a synthetic rubber produced by polymerization of chloroprene and which is widely used in a variety of products. Neoprene is resistant to ozone, weathering, many chemicals, oil, flame and temperature variations. The grommet 400 is resilient and compressible.

FIG. 4B comprises a partial cross section of the grommet 400 taken along the line 4B—4B of FIG. 4A. In like manner, FIG. 4C is a cross section on the line 4C—4C of FIG. 4A.

The grommet 400 is fabricated by molding the neoprene to achieve the shape illustrated. The grommet 400 includes a central passageway 401 which is generally cylindrical. The outer lower portion 402 is generally slightly tapered so that the diameter at the lower end 403 is slightly less than the diameter at the upper end 404. The outer upper portion 405 has a noticeably larger taper 406.

The grommet 400 includes a plurality of sockets 407 which will serve a function to be described more fully hereinafter and which approximately mates with portions of the strain relief member 300 in a manner to be described. As may be most clearly seen in FIGS. 4B and 4C, the sockets 407 extend to approximately the upper end 404 of the outer lower portion 402. The grommet 400 also includes a chamfer 408. As may be seen in FIGS. 1, 6A and 6B, the grommet 400 is placed in the upper chamber 506 of the body member 500 and the outer upper portion 405 is exterior of the body member 500.

Figure 3A:
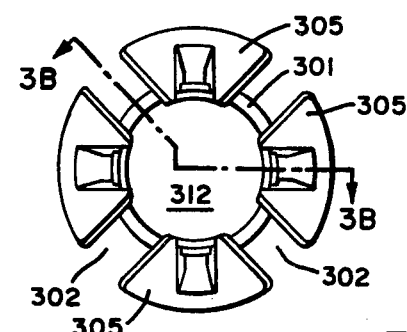
FIGS. 3A and 3B comprise views of the strain relief member.
Figure 3B:
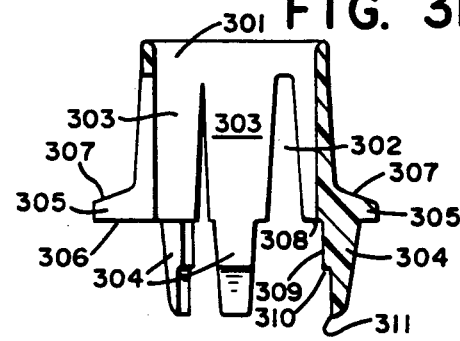

The combined strain relief and cord grip assembly also includes strain relief member 300 which is shown individually in FIGS. 4A and 3B wherein FIG. 3B is a cross section taken along the line 3B—3B of FIG. 3A. The strain relief member 300 is preferably made of a material which is neither compressible nor supple but which is flexible. Although some metals might be suitable, the strain relief member 300 is preferably made of a suitable plastic, such as nylon, having the necessary and appropriate characteristics. Although the strain relief member 300 could be a machined part, it is preferably molded from a suitable plastic. As may be seen and as will be described, the strain relief member 300 comprises a plurality of substantially identical elongated members or legs joined at one end of the grommet 400 is inserted into the upper chamber 506 of the body member 500 until the lower limit of the outer lower portion 402 strikes the taper 508 and/or until the upper end 404 of the lower portion 402 engages with the upper limit of the upper chamber 506. The strain relief member 300 is assembled with the grommet 400 so that the fingers 304 of the lower portion of the strain member mate with the sockets 407 of the grommet 400 until such time as the lower extremity of the member 304 engages with the lower limit of the socket 407 and/or until the lower surface 306 of the flange 305 engages the upper limit 409 of the upper portion 405 of the grommet 400. Thereafter, but not shown in FIG. 6A, the nut 200 will have its threads 202 engaged with the threads 504 of the body member 500. With sufficient engagement of the cited threads, the internal shoulder 203 of the nut will engage the upper surface 307 of the flange 305. It should be understood that spacings and clearances between components in FIG. 6A may vary from those shown and that the illustrated proportions and spacings are for clarity.

In a typical application of the fitting 100, it would be attached to a junction box or panel, etc., using threads 503 and/or locknut 800. Thereafter, with the nut 200 loosely assembled to the body 500 and with the grommet 400 and strain relief member 200 in place, the wire 700 would be passed through the fitting 100 into the box so that there is sufficient wire within the box to make the required electrical connections. The compression nut 200 would then be fully tightened to the body member 500 to achieve the secured assembly as described. Thereafter the final electrical connections would be made.

Of course, the individual elements could be threaded onto the wire and then assembled as described. Also, the fitting 100 could be secured to the wire prior to securing the fitting 100 to the junction box.

With the parts assembled as illustrated in FIG. 6A and with a wire 700, having a diameter within an appropriate range, and with the nut 200 assembled therewith, the nut may be tightened with the result as illustrated in FIG. 6B. More specifically, as the internal shoulder 203 of the nut 200 bears on the upper surface 307 of the flange, the lower extremity of the member 304 will act on the lower limit of the socket 407 which will tend to stuff the grommet 400 into the upper chamber 506 of the body member. Concurrently, the lower surface 306 of the flange will coact with the upper limit 409 of the upper portion 405 providing an additional force for stuffing the grommet into the chamber 506. As illustrated in FIG. 6B, it should be observed that the wire 700, the limits of the upper chamber 506, the taper 508 and the members 304 all serve to confine the volume into which the grommet may be stuffed. Accordingly, the portions of the grommet which are within the chamber 506 are compressed and produce radial forces which coact with by a web or ring 301. Separating each of the elongated members is a slot 302. The elongated members include an upper portion 303 which depends from the web or ring 301. There is also a lower portion 304 which depends from the upper portion 303. Intermediate of the upper and lower portions 303 and 304, respectively, is a flange 305 having a generally planar lower surface 306 and an inclined upper surface 307. The points 308, 310 and 311 formed on the lower portion 304 will, during assembly, be pivoted towards the cord 700 to be pressed into the outer insulation of the cable and deform it slightly. This results in a greatly increased resistance to pull out.

Because of the flexibility of the material of the member 300, opposing ones of the legs thereof may be moved towards or away from each other. If the lower portions 304 are moved sufficiently towards each other, the slots 302 may be substantially closed. As will be seen hereinafter, the lower portions 304 are configured for mating with the sockets 407 of the grommet 400 and the sockets 407 are equal in number to the leg portions 304.

The structure 100 also includes a nut 200 which includes a plurality of flat parallel surfaces 201 which are adapted to be engaged by a wrench for tightening the nut 200 onto the body member 500. As will be seen, the nut 200 includes internal threads 202 which engage with the threads 504 of the body member 500. Usually the nut 200 will be made of the same material as the body member 500. It may also be cast and subsequently reamed and threaded all in a manner with which those familiar with the fabrication of similar parts are familiar. The nut includes a shoulder 203. The nut has a through passageway 204 which is preferably funnel shaped at the upper end. At the lower end of the nut 200 is a flange 205. If the interior of the nut, including shoulder 203, is formed by a reaming process, it is possible that the wall thickness of the nut between the interior shoulder 203 and the exterior shoulder 206 may be below a prescribed minimum. To guard against this, the reamer can be designed to cut the lower surface of the nut 200 and reduce the height of the flange 205. By this means, the flange height can provide an indirect measure of the wall thickness between the shoulders 203 and 206.

As previously mentioned, a principal function of the structure 100 is to provide a liquid tight seal and to secure a flexible conductor 700 which may include a plurality of individual conductors 701 so that the wire 700 will resist longitudinal movement in response to a longitudinal force. Another principal function is to secure the wire 700 in a manner such that it will not be subjected to unusually sharp bends and/or surfaces or corners in the area where it exits from the structure 100.

The various components described hereinabove are illustrated in their cooperative relationship in cross section in FIG. 6A. More specifically, the lower portion 402 the wire 700. The described forces act to provide a liquid tight seal and to impede longitudinal motion of the wire 700 with respect to the structure 100. In addition, as the grommet 400 is stuffed into the chamber 506, the upper portion 405 of the grommet applies radial forces to the portion 304 of the strain relief member thereby tending to pivot it about the rim 301 of the strain release and gripping member 300 and causing the surfaces and/or edges indicated as 308 through 311 to bear on the wire 700 and provide a principal deterrent for restricting the longitudinal motion of the wire 700 with respect to the structure 100. It should be observed, as illustrated in FIG. 6B, that considerable deformation and compression of the grommet 400 takes place in response to the stuffing action which, in turn, results from the tightening of the nut 200.

The stuffing and compression of the grommet 400 forms a watertight seal with the wire 700 and the inside of body member 500. The rubber like grommet 400 may have a Poisson's ratio of approximately 0.4 and will compress in response to the forces applied in response to tightening the nut 200 on the body member 500. Because of the mating of the members 304 and the sockets 407 and the fact that the lower portion 402 of the grommet 400 is proportioned to the geometry of the chamber 506, there are no empty air spaces and the forces generated by compression of the grommet increases the force against the wire 700 and causes the members 304 to pivot about the rim 301 of the strain relief member all of which results in sealing and restraining the wire 700 to prevent longitudinal motion thereof with respect to the fitting 100.

The original outer diameter of the outer insulation of the wire 700 should be no greater than the inner diameter of the passageway 401. The difference should be sufficiently small that the compressive forces of the grommet applied to the members 304 cannot pivot the members 304 sufficiently to close the slots 302. It should be understood that the relative proportions of the elements between FIGS. 6A and 6B are for illustration only and to show principles. For example, in an actual example, the portion 405 of the grommet 400 would likely fill into the spaces between the threads 202 and part of the grommet 200 might tend to be extruded downward into chamber 507 of the body member.

Considering more specifically FIG. 1 and for this discussion, assuming that the various components are securely assembled in the manner illustrated in FIG. 6B, it will be seen that if a force is applied to the wire 700 in a direction normal to the axis thereof that the wire will be inclined and lean against the upper portions 303 of the strain relief member 300. If the force normal to the axis of the wire 700 is sufficiently great, the member 300 may flex some and the wire will be bent around the curved surface of the web or ring 301. It should be noted, as may be seen in FIGS. 1 and 3B, that the upper limits of the web or ring 301 is rounded and therefore, the wire 700 is not exposed to a sharp surface. If desired, the upper portion 303 of the strain relief member 300 could be extended longitudinally and/or given additional outward flare in order to provide additional flex relief.

While there has been shown and described what is considered at present to be the preferred embodiments of the invention modifications thereto will readily occur to those skilled in the related arts. For example, in another structure, the strain relief member could include friction points or barbs to further impede longitudinal motion of the wire. Further, the passageways through the grommet and strain relief members could be modified to accommodate wires with non-cylindrical configurations. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiment shown and described, and it is intended to cover in the appended claims all such modifications as fall within the true spirit and scope of the invention.

I claim:

1. In a cord grip having a body member with a passageway therethrough for the cord and with an upper chamber, a nut threadedly engageable with said body and having an internal shoulder and an upper end with an opening therein, a compressable grommet in said upper chamber, said grommet having an upper end and recesses in its internal surface extending longitudinally thereof from said upper end of said grommet, the improvement comprising a strain relief and gripping member extending through said opening in said upper end of said nut into said upper chamber, said strain relief and gripping member having a plurality of laterally opposed elongated members extending longitudinally thereof, said elongated members being disposed in different ones of said recesses in the internal surface of said grommet, flanges extending radially outward from said elongated members and disposed centrally of the length thereof, the lower surface of each of said flanges being seated upon said upper end of said grommet, the upper surface of each of said flanges being engageable with said shoulder of said nut to pivot the lower ends of said elongated members inwardly into gripping engagement with the cord and to compress said grommet into engagement with the cord.

2. The invention according to claim 1 wherein said strain relief and gripping member has a length from said upper surface of each of said flanges to the upper end thereof greater than the distance between said flanges and said opening in said nut whereby said strain relief and gripping member extends upwardly beyond said nut when said strain relief and gripping member is in gripping relationship with the cord.

3. The invention according to claim 1 wherein said strain relief member has an upper rim and a passageway therethrough, said elongated members being connected to said upper rim.

4. The invention as set forth in claim 3 wherein said strain relief and gripping member including said rim and said elongated members thereof are integral with each other and consist of flexible material.

5. The invention as set forth in claim 1 wherein said grommet, nut and strain relief and gripping member are generally cylindrical except for flats on at least said nut for providing wrench engaging surfaces.

6. The invention as set forth in claim 1 wherein said grommet has upper and lower portions, said longitudinal recesses in said grommet are sockets in said upper portion, said upper portion having an external wall which tapers radially outward toward the upper end of said grommet.

7. The invention as set forth in claim 1 wherein said lower surface of each of said flanges and the upper end of said grommet are in a plane normal to the longitudinal axis of said body passageway.

8. The invention as set forth in claim 7 wherein the surface of the internal shoulder of said nut and the upper surface of each of said flanges each comprise a frustrum of a right circular cone.

9. The invention as set forth in claim 6 wherein said elongated members are legs and have a width within the range of approximately ½ to double that of the spaces therebetween.

10. The invention as set forth in claim 1 wherein the boundaries of said upper chamber in said body are the upper end of said body and a tapered stop engageable with the lower end of said grommet for limiting the downward movement thereof.

11. The invention as set forth in claim 10 wherein the internal wall of said upper chamber and said tapered stop of said body member, said lower surfaces of said flanges permits said grommet to expand only towards the center of said passageway in response to compressive forces from said strain relief and gripping member applied by said nut being screwed downwardly onto said body.

12. The invention as set forth in claim 11 wherein the inner surface of each of said legs include a configuration to implement a gripping action for impeding the longitudinal movement of the cord.

13. The invention as set forth in claim 3 wherein the diameter of the passageway through said strain relief and gripping member above said flanges is greater than the diameter of the passageway through said grommet after said nut has been screwed fully downwardly upon said body.

* * * * *